United States Patent
Ahmed et al.

(10) Patent No.: US 9,374,348 B2
(45) Date of Patent: Jun. 21, 2016

(54) SYSTEM AND METHOD TO ENABLE UNLICENSED MOBILE ACCESS ACROSS TERMINALS

(75) Inventors: Mohammed M. Ahmed, Schaumburg, IL (US); Moon Do Seo, Hoffman Estates, IL (US)

(73) Assignee: Google Technology Holdings LLC, Moutain View, CA (US)

( * ) Notice: Subject to any disclaimer, the term of this patent is extended or adjusted under 35 U.S.C. 154(b) by 1817 days.

(21) Appl. No.: 11/779,979

(22) Filed: Jul. 19, 2007

(65) Prior Publication Data

US 2009/0023442 A1    Jan. 22, 2009

(51) Int. Cl.
*H04M 1/00* (2006.01)
*H04L 29/06* (2006.01)
*H04W 12/06* (2009.01)

(52) U.S. Cl.
CPC .............. *H04L 63/08* (2013.01); *H04L 63/164* (2013.01); *H04W 12/06* (2013.01)

(58) Field of Classification Search
CPC ...... H04L 63/08; H04L 63/164; H04W 12/06
See application file for complete search history.

(56) References Cited

U.S. PATENT DOCUMENTS

| | | | |
|---|---|---|---|
| 2002/0085516 A1 | 7/2002 | Bridgelall | |
| 2003/0054859 A1* | 3/2003 | Goto | 455/557 |
| 2004/0180657 A1* | 9/2004 | Yaqub et al. | 455/435.1 |
| 2005/0088999 A1* | 4/2005 | Waylett et al. | 370/338 |
| 2005/0282584 A1* | 12/2005 | Faisy | 455/558 |
| 2006/0063560 A1* | 3/2006 | Herle | 455/552.1 |
| 2006/0099935 A1* | 5/2006 | Gallagher et al. | 455/414.1 |
| 2006/0105810 A1* | 5/2006 | Gnuschke | 455/558 |
| 2006/0154665 A1 | 7/2006 | Svensson et al. | |
| 2007/0002844 A1 | 1/2007 | Ali | |
| 2007/0047707 A1* | 3/2007 | Mayer et al. | 379/114.28 |
| 2007/0049342 A1* | 3/2007 | Mayer et al. | 455/558 |
| 2008/0003952 A1* | 1/2008 | Sjostrom et al. | 455/74.1 |
| 2009/0225736 A1* | 9/2009 | Patarkazishvili | 370/338 |
| 2009/0323673 A1* | 12/2009 | Gabbay et al. | 370/352 |
| 2010/0023316 A1* | 1/2010 | Knowles et al. | 704/3 |

FOREIGN PATENT DOCUMENTS

| | | |
|---|---|---|
| DE | 202005004352 U1 | 6/2005 |
| DE | 102004031126 A1 | 1/2006 |
| WO | 2005114918 A2 | 12/2005 |

OTHER PUBLICATIONS

FRITZ! DSL/WLAN FRITZ! Box Fon WLAN 7050, Installation, Configuration and Operation of FRITZ!Box FON WLAN 7050 English Edition, Instruction Manual, AVM GmbH 2006, all pages.
Germany, Official Communication from the German Patent and Trademark Office dated Jun. 27, 2011, all pages.

* cited by examiner

*Primary Examiner* — Kashif Siddiqui
(74) *Attorney, Agent, or Firm* — Lerner, David, Littenberg, Krumholz & Mentlik, LLP

(57) ABSTRACT

A method and apparatus is provided for establishing a Global System for Mobile communications (GSM) call through an Unlicensed Mobile Access (UMA) Network by enabling Voice over IP (VoIP) access into a GSM network from various IP-enabled mobile device terminals and a mechanism to authenticate and use such terminals without any change to the UMA or GSM network.

19 Claims, 7 Drawing Sheets

SYSTEM AND METHOD TO ENABLE UNLICENSED MOBILE ACCESS ACROSS TERMINALS

FIELD OF THE INVENTION

The present invention relates generally to mobile wireless communications, and in particular, a method and apparatus that employs the unlicensed mobile access network. The present invention relates generally to use of the Generic Access Network (hereinafter "GAN"), otherwise known as Unlicensed Mobile Access (hereinafter "UMA"), by a mobile device. More specifically, embodiments of the present invention are related to systems that allow a seamless handover between local area networks and wide area networks.

BACKGROUND

When the Third Generation Partnership Project (hereinafter "3GPP") adopted UMA in April 2005, it also became known as GAN. UMA/GAN describes a telecommunication system allowing seamless roaming and handover between local area networks and wide area networks using a dual-mode mobile phone. Local area networks may be based on the Bluetooth or 802.11 (Wireless Fidelity, hereinafter "WiFi") standards, while a wide area network may be based on Global System for Mobile communications (hereafter "GSM"), General Packet Radio Service (hereinafter "GPRS"), or Universal Mobile Telecommunications Systems (hereinafter "UMTS") mobile standards.

The ultimate goal of UMA is fixed/mobile convergence, that is, the convergence of mobile, fixed and internet telephony. By deploying UMA technology, mobile operators (hereinafter "carriers") can enable subscribers to roam and be handed over between cellular access networks (hereinafter "mobile networks") and public and private unlicensed wireless networks. This type of handover allows carriers the use of local networks to deliver voice, data and IP Multimedia Subsystems (hereinafter "IMS") and Session Initiation Protocol (hereinafter "SIP") type applications to mobile phones. The aim is to provide all mobile, fixed and internet telephony services with a single phone number or service identification number.

With UMA, subscribers receive a consistent user experience for their mobile voice and data services as they transition between networks using a dual-mode phone. Presently, on a cellular network, a mobile device communicates over the air with a base station, through a base station controller, to servers in the core mobile network of the carrier. Under the UMA system, the mobile device establishes a secure IP connection through a gateway to a server called a UMA Network Controller (hereinafter "UNC") on the carrier's network. The UNC translates the signals coming from the mobile device so that the signals appear to be coming from another base station. Thus, when a mobile device communication moves from a GSM to a WiFi network, it appears to the core mobile network as if the GSM mobile device was simply handed over to a different base station.

If UNCs are used extensively, carriers will not have to erect expensive base stations to cover every area of a neighborhood. Mobile subscribers will have perfect coverage in their homes or offices through UMA network access. Furthermore, a subscriber will not be tied to a Plain Old Telephone System (hereinafter "POTS") land line telephone when communicating from their home or office. They subscriber can seamlessly transition from his/her home or office UMA network to the cellular network. Finally, the mobile subscriber will enjoy the convenience of having a single phone number.

Currently, the solutions for fixed mobile convergence and the use of the UMA system are tied to WiFi availability and require that the mobile device be dual mode. The mobile device must be capable of detecting at least two different radio technologies, e.g., GSM and WiFi. Therefore, the mobile devices must have two different radios on board. Both radios must be scanning for networks at all times, in case the user roams into an area where a WiFi network exists. This constant search for networks has a large power requirement. As a result, the battery charge is depleted at a rate faster than the battery charge of a single-mode phone. WiFi access is also subject to interference from nearby devices such as microwave ovens and florescent lighting. Furthermore, the addition of WiFi access capability to a mobile device significantly increases the cost. A subscriber is also required to configure the mobile device to access both networks.

What is needed is a method and apparatus for allowing a user to utilize the UMA fixed mobile convergence without requiring a dual mode mobile phone or communication device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
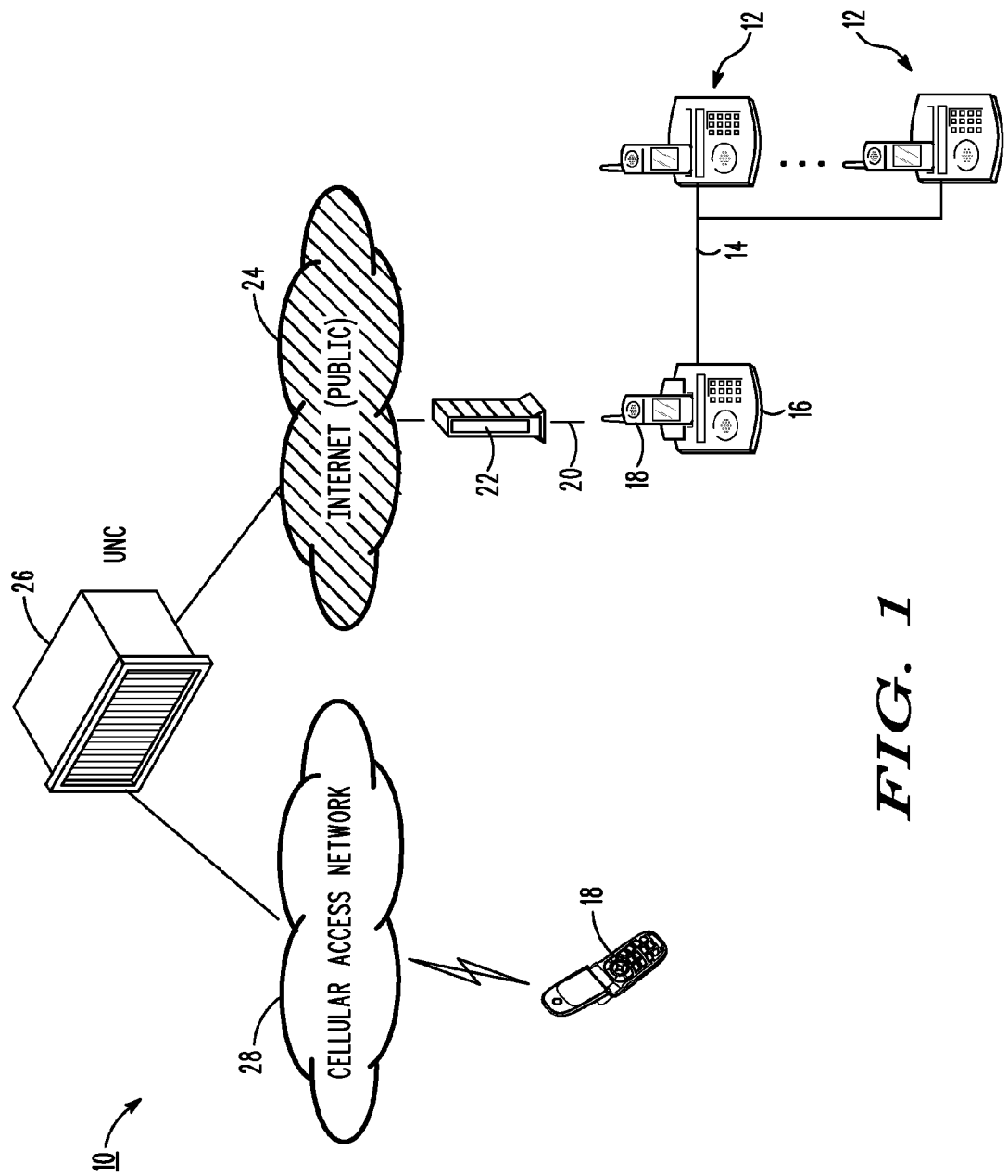
FIG. 1 is a block diagram of an exemplary communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to enabling GSM communications through the UMA Network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of enabling GSM communications through the UMA Network described herein. The non-processor circuits may include, but are not limited to, a radio receiver, a radio transmitter, signal drivers, clock circuits, power source circuits, and user input devices. As such, these functions may be interpreted as steps of a method to perform GSM communications through the UMA Network. Alternatively, some or all functions could be implemented by a state machine that has no stored program instructions, or in one or more application specific integrated circuits (ASICs), in which each function or some combinations of certain of the functions are implemented as custom logic. Of course, a combination of the approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method is disclosed for establishing GSM communications through an UMA Network. The method includes enabling Voice over Internet Protocol (hereinafter "VoIP") access into the GSM network from various Internet Protocol (hereinafter "IP")—enabled mobile device terminals. The method further includes a seamless (i.e., transition from one network to the other without communication interruption) handover from the GSM wireless communication access network to the UMA network while switching from a single or dual mode mobile phone or mobile device (hereinafter "mobile device") to a POTS cordless or landline phone.

A system for establishing GSM communications through a UMA network from various IP-enabled mobile device terminals and a mechanism to authenticate and use such terminals without any change to the UMA or GSM network is disclosed. The system includes a mobile device terminal capable of being authenticated by the mobile device and, subsequently, emulating the mobile device such that the cellular core network views the mobile device terminal and a connected POTS phone as the mobile device. A UNC facilitates the communication between the mobile device terminal and cellular core network by translating the signals from the mobile device terminal to make it appear as if the signals were coming from another cellular access network base station.

Figure 2:
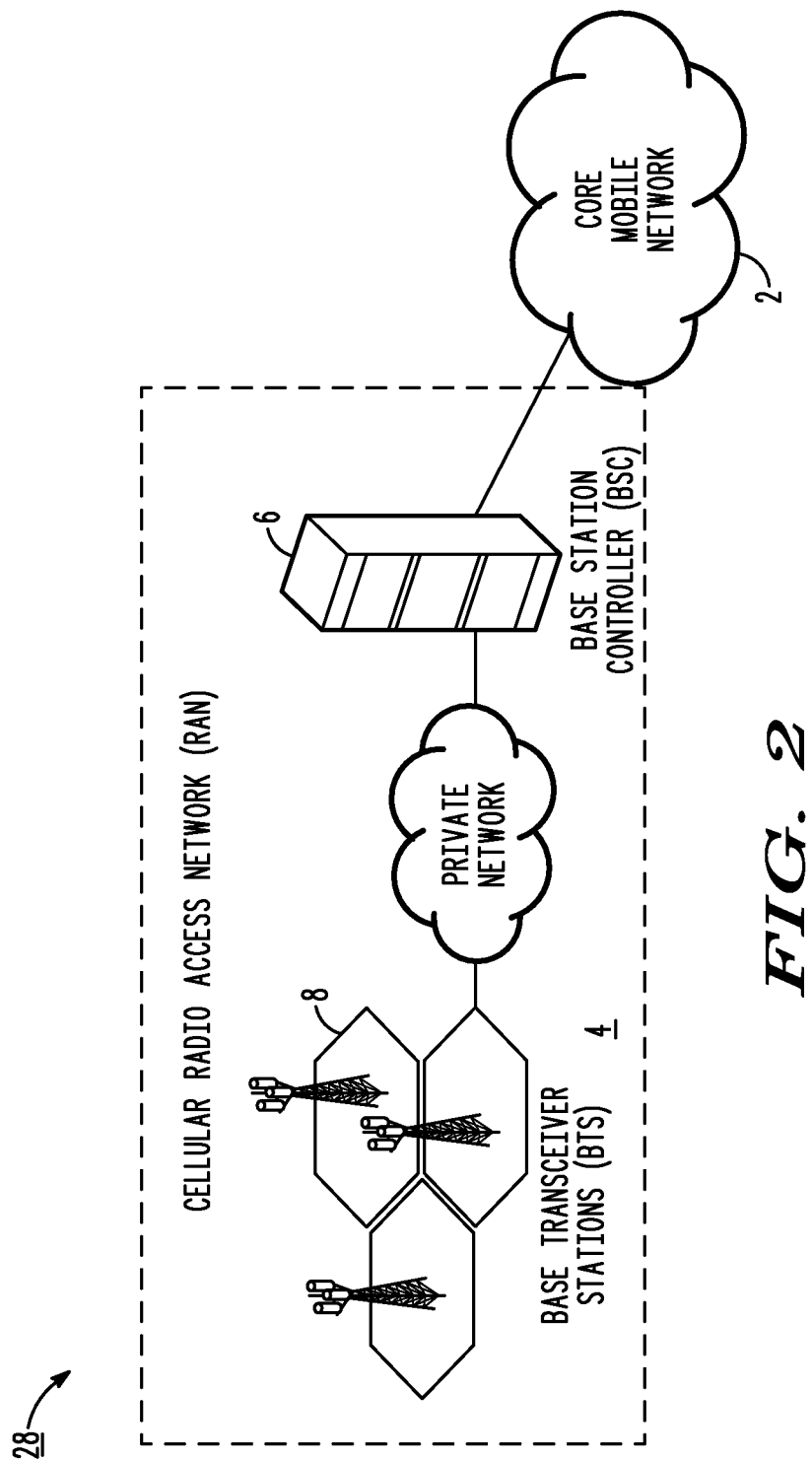
FIG. 2 is a block diagram of a cellular network system of FIG. 1 in accordance with an embodiment of the present invention.

Referring now to FIGS. 1 and 2, an exemplary network 10 system setup is illustrated in accordance with some embodiments of the present invention. A mobile device 18 is wirelessly connected to a Cellular Access Network 28. The basic Cellular Access Network 28, shown in FIG. 2, comprises a Core Network 2 and a Cellular Radio Access Network 4, which further comprises a series of base station controllers (hereinafter "BSCs") 6 and base transceiver stations (hereinafter "BTSs") 8. The mobile device 18 contains within its circuitry an electric switch number, that is usually but not exclusively hardwired into the device. The electronic switch number may be considered as a serial number. The mobile device 18 may also contain a mobile ID number, usually but not exclusively stored in a Subscriber Identity Module (hereinafter "SIM"). Also, the mobile device 18 may include system protocol information, such as authentication information, subscription information and network state information including current Location Area Identity (LAI), stored within the hardwired circuitry of the mobile device 18, the mobile device 18 SIM, or within another means or variation thereof. The mobile device 18, transmits these numbers and protocol information through the cellular BTSs 8 and BSCs 6 to the Cellular Core Network 2 to establish and maintain communications through the Cellular Radio Access Network 4. A UMA Network Controller (hereinafter "UNC") 26 is connected to the Cellular Radio Access Network 4 through methods well known within the art. The UNC 26 appears to the Cellular Access Network 28 as another BSC. The UNC 26 is connected to a data network 24, such as the Internet. The UNC 26 also provides a bridge between the Cellular Access Network 28 and an Internet 24. Together, the UNC 26 and the Internet 24 may collectively be referred to herein as a UMA Network.

Figure 3:
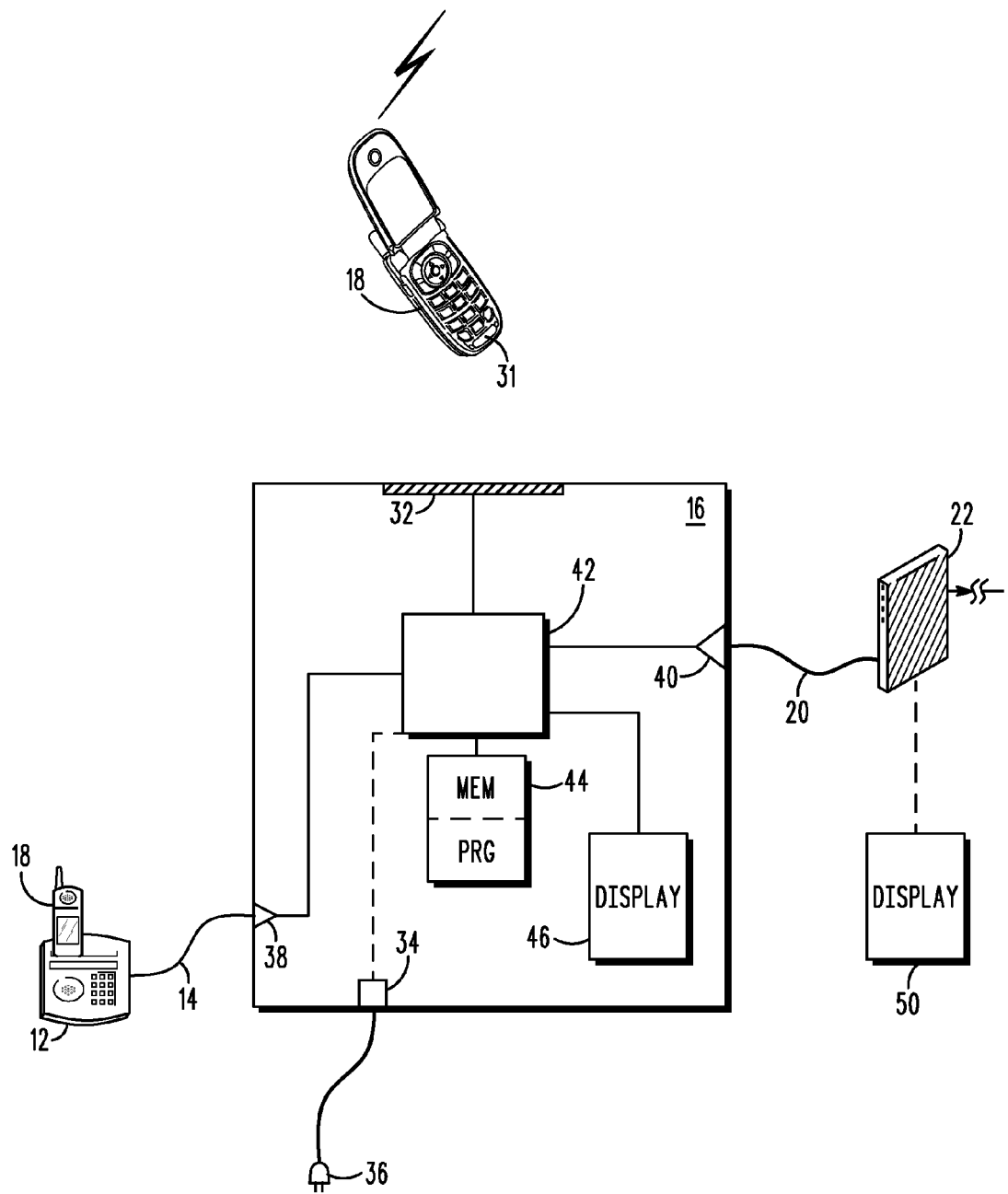
FIG. 3 is a block diagram of a mobile device terminal in accordance with some embodiments of the present invention.

Referring now to FIGS. 1 and 3, mobile device 18 is adapted to be electrically connected to a mobile device terminal 16. This connection can be made through a docking port interface 31 located on one side of the mobile device 18 interconnecting with a docking terminal 32 on the mobile device terminal 16 though a physical interface, such as a mini-USB connector or standard USB connection. This connection can also be made through a wireless medium, such as infrared, Bluetooth or 802.11, e.g., WiFi connections. The mobile device terminal 16 can be adapted to cradle the mobile device 18 on or within the mobile device terminal 16 structure to facilitate the electrical connection between the docking port interface 31 of the mobile device 18 and the docking terminal 32 of the mobile device terminal 16 as shown in FIG. 3. The mobile device terminal 16 can also be a stand alone device, for example, may be included in a computer, where the connection to the mobile device 18 is established through a cable connected between the docking terminal 32 of the mobile device terminal 16 and the docking port interface 31 of mobile device 16. The connection may also be established through one of the previously mentioned wireless mediums.

The mobile device terminal 16 can be adapted to be electrically powered through an electrical connection port 34 detachably connected to a power cord 36 connected to an AC power source. The mobile device terminal 16 may also be powered through a DC power source (not shown). In additional embodiments, the mobile device terminal 16 can also be adapted to electrically recharge the battery of the mobile device 18.

The mobile device terminal 16 is connected through a first communication port 38 and a first communication medium 14 to a POTS phone 12. In one embodiment the first communication port 38 is a RJ-11 port and the first communication medium 14 is a RJ-11 style conductor. In another embodiment, the first communication port 38 and first communication medium 14 are a wired connection medium that facilitates voice and data communication between the mobile device terminal 16 and the POTS phone 12. In another embodiment, the first communication port 38 and the first communication medium 14 are a wireless medium that facilitates voice and data connection between the mobile device terminal 16 and the POTS phone 12 such as, but not limited to, Bluetooth or 802.11, e.g., WiFi connections, RF and infrared connections. In another embodiment, the mobile device terminal 16 can be connected to multiple POTS phones 12.

The mobile device terminal 16 is additionally connected through a second communication port 40 adapted to be connected to a second communication medium 20. The second communication medium 20 is further connected to a standard internet connection device 22. The second communication port 40 and the second connection medium 20 can be a cable port and connection or a wireless port and connection utilizing WiFi, RF or any other unlicensed wireless medium known in the art. The internet connection device 22 can be any device that has the ability to connect to the internet as well as peripheral devices such as a broadband cable or DSL modem, wireless router, or a personal computer connected to the internet. The internet connection device 22 is electrically connected to the Internet 24 using well-known methods. The UNC 26 is additionally electrically connected to the Internet 24 using methods well known to those skilled in the art.

An exemplary mobile device terminal 16 comprises a microprocessor 42 electrically connected to a memory device 44. The microprocessor 42 is electrically also connected to the first communication port 38 as well as electrically connected to second communication port 40. The microprocessor 42 is further electrically connected to docking terminal 32. The memory device 44 stores data as well as programs for use by the microprocessor. The mobile device terminal 16 may also include a display 46 that is electrically connected to the microprocessor 42.

Figure 4:
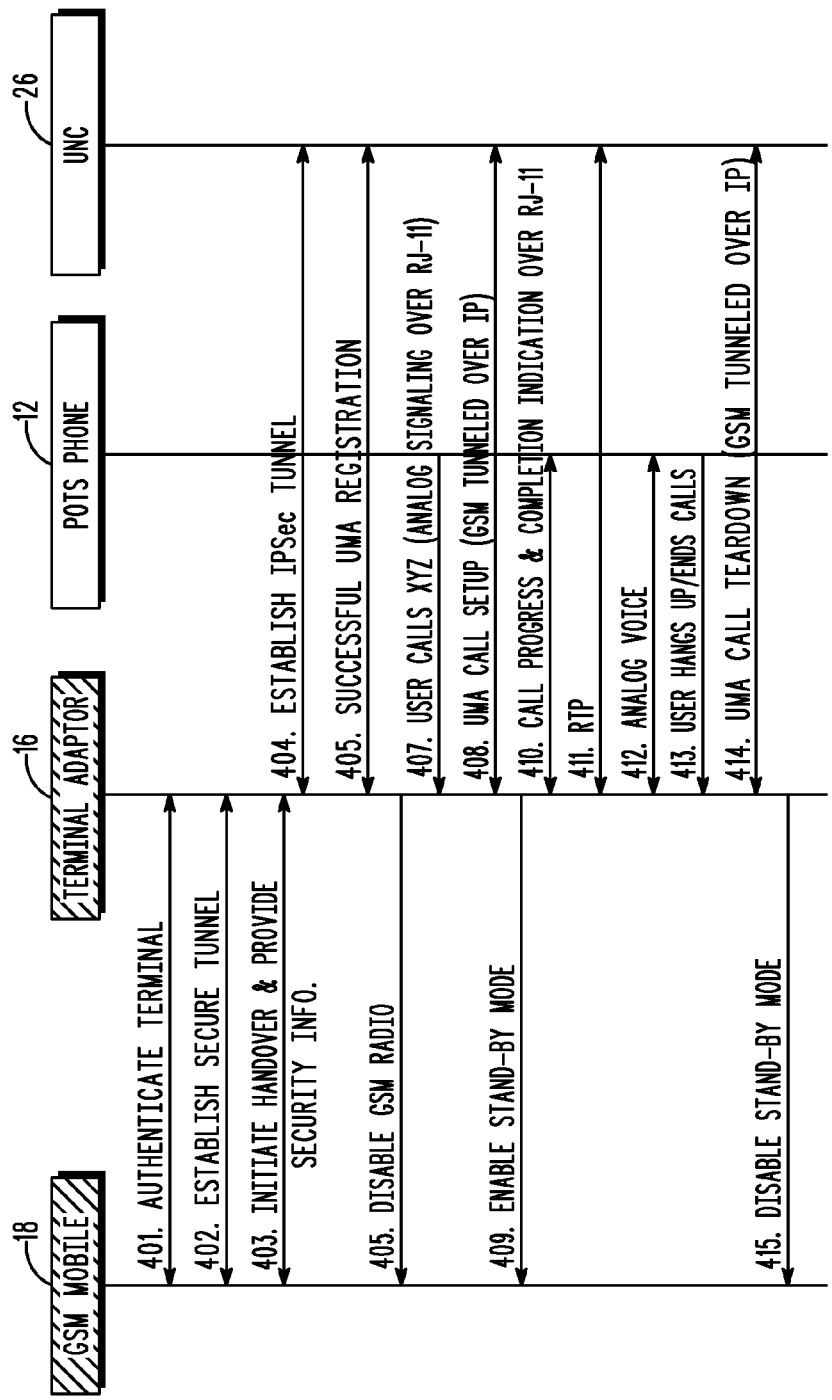
FIG. 4 is a signal flow diagram illustrating the information conveyed between the mobile device, mobile device terminal, POTS phone, and the UMA Network Controller when a user first docks a mobile device when not in a call then calls using a POTS phone in accordance with some embodiments of the present invention.

Referring now to FIG. 4, a signal flow diagram is provided for when a mobile subscriber first docks a mobile device 18, when not in a call, then initiates a call using a POTS phone 12. A mobile subscriber not currently using (i.e. not currently engaged in a wireless phone conversation) mobile device 18, docks mobile device 18 in the mobile device terminal 16 by placing the mobile device 18 in the mobile device terminal 16 cradle. The docking terminal 32 of the mobile device terminal 16 electrically connects to the docking port interface 31 of the mobile device 18. A sequence to authenticate 401 the mobile device terminal 16 occurs when the connection is initially established between the docking port interface 31 of the mobile device 18 and docking terminal 32 of the mobile device terminal 16. When a connection is established between the mobile device terminal 16 and the mobile device 18, a program, stored within the memory 44 of the mobile device terminal 16, is executed by the microprocessor 42. The mobile device terminal 16 requests authentication information from the mobile device 18. The mobile device 18 exchanges authentication information, such as username and password, with the mobile device terminal 16 to ensure that only a mobile device 18 that is authorized to use this mobile device terminal 16 is able to establish a secure communication path 402. Once the mobile device 18 and mobile device terminal 16 are authenticated, a secure communication path 402 is established by exchanging encryption keys so that communication between the mobile device 18 and the mobile device terminal 16 is encrypted. The mobile device terminal 16 initiates a handover 403 of GSM communications over the Cellular Access Network 28 to the UNC 26. The mobile device terminal 16 requests the mobile ID number and system protocol information from the mobile device 18. The mobile device terminal 16 receives, from the mobile device 18, the mobile ID number and system protocol information which is normally stored on the mobile device 18 SIM. The mobile device terminal 16 may not contain a SIM. Therefore, when the mobile device terminal 16 receives the mobile ID number and system protocol information, the microprocessor 42 of the mobile device terminal 16 stores the mobile ID number and system protocol information in the memory 44 of the mobile device terminal 16. The microprocessor 42 thereafter uses the stored mobile ID number and system protocol information stored in the memory 44 in order to be viewed as the mobile device 18 by the cellular access network 28.

It is the mobile device terminal 16 that initiates a connection to a UNC 26. In response to receiving the mobile ID number and system protocol information, the mobile device terminal 16 uses the internet connection 22 to contact the UNC 26 through the internet 24. The microprocessor 42 uses information stored in the memory 44 regarding the address of the UNC 26. The microprocessor 42 of the mobile device terminal 16 then directs the internet connection device 22, connected to the mobile device terminal 16 through second communication port 40 and communication medium 20, to establish a connection with the UNC 26. The mobile device terminal 16 then establishes an internet protocol secure (hereinafter "IPSec") pathway 404 between the mobile device terminal 16 and the UNC 26. Thereafter, the mobile device terminal 16 seeks UMA registration 405 by using the mobile ID number and system protocol information stored in memory 44 that was previously received from the mobile device 16. The mobile device terminal 16 uses the stored mobile ID and system protocol information for authentication and authorized access to the GSM voice and GPRS data services via the UMA network. If the mobile device terminal 16 is approved for access by the UNC 26, the UNC 26 updates the subscriber's current location information stored in the core network 2 to reflect that communications are being routed through the UNC 26. After the subscriber's current location information has been updated, all mobile voice and data traffic is routed to the mobile device terminal 16 via the UMA Network rather than through the Cellular Radio Access Network 4.

After successful UMA registration 405 of the mobile device terminal 16, the GSM radio of the mobile device 18 switches to a non-transmit, non-receive mode 406. The mobile device terminal 16 instructs the GSM or other transmit/receive radio of the mobile device to switch to a non-transmit/non-receive mode since it is the mobile device terminal that has a completed communication connection with the UNC 26. This ensures that only the mobile device terminal 16 communicates with the Cellular Access Network 28 via the UNC 26.

When the mobile subscriber decides to place a call 407, the subscriber may pickup the handset of the POTS phone 12 and dial the desired number. The subscriber's calls are placed from the POTS phone 12 using standard analog signaling over the communication medium 14 through the first communication port 38. The mobile device terminal 16 and UNC 26 then setup the call 408 and channel it as a GSM call over IP. The mobile device terminal 16 initiates the placement of, and places, the mobile device 18 in a stand-by mode 409 by providing an appropriate signal to the mobile device 18. In stand-by mode 409, the mobile device is ready to pick-up the call in the event the subscriber decides to switch from the POTS phone 12 to the mobile device 18 during a call. A User Interface (hereinafter "UI") located on the mobile device 18 or on the mobile device terminal 16 can be utilized to alert the subscriber that there is an active call to pickup when the mobile device 18 is removed or disconnected from the mobile device terminal 16.

Once a call is in progress, a call progress and completion indication 410 is transferred between the mobile device terminal 16 and POTS phone 12 over the communication medium 14 through the first communication port 38. This call progress and completion indication can also be transferred between the mobile device terminal 16 and the POTS phone 12 upon termination of the call. The GSM communication signal is carried from the mobile device terminal 16 to the UNC 26 via an IP-based, for example, Voice over Internet Protocol (hereinafter "VoIP"), signal by using standard Real Time Protocol (hereinafter "RTP") packets 411. The microprocessor 42 operates with an encoder/decoder (not shown) to perform the function of a terminal adaptor that converts the IP-based signaling to analog signals that can be used with a standard POTS phone 12. The microprocessor 42 also operates with the encoder/decoder to perform the function of a terminal adaptor to convert standard POTS phone analog signals into IP-based, for example, Voice over IP (hereinafter "VoIP"), signals. The analog signals may be converted into GSM communications using RTP packets 411 to produce IP-based, for example, VoIP, packets that are sent to the UNC 26. The microprocessor also converts the RTP packet-based GSM signals received from the UNC 26 into analog signals to be sent to the POTS phone 12. As a result, the mobile device terminal 16 translates the VoIP/RTP packets such that the signal between the POTS phone 12 and mobile device terminal 16 remains analog 412 while the signal between the mobile device terminal 16 and the UNC uses RTP packets 411, or VoIP. When the mobile subscriber ends the call 413, the mobile device terminal 16 and UNC 26 tear down the UMA call and terminate the GSM communication signal over IP 414. Thereafter, the mobile device terminal 16 disables the stand-by mode 415 in which the mobile device 18 was previously placed. The standby mode 415 may be considered a user interface (UI) indication. When the mobile device receives a signal from the mobile device terminal 16 to exit standby mode, the mobile device will clear its UI and will activate the mobile device's RF transmitters and receivers.

Figure 5:
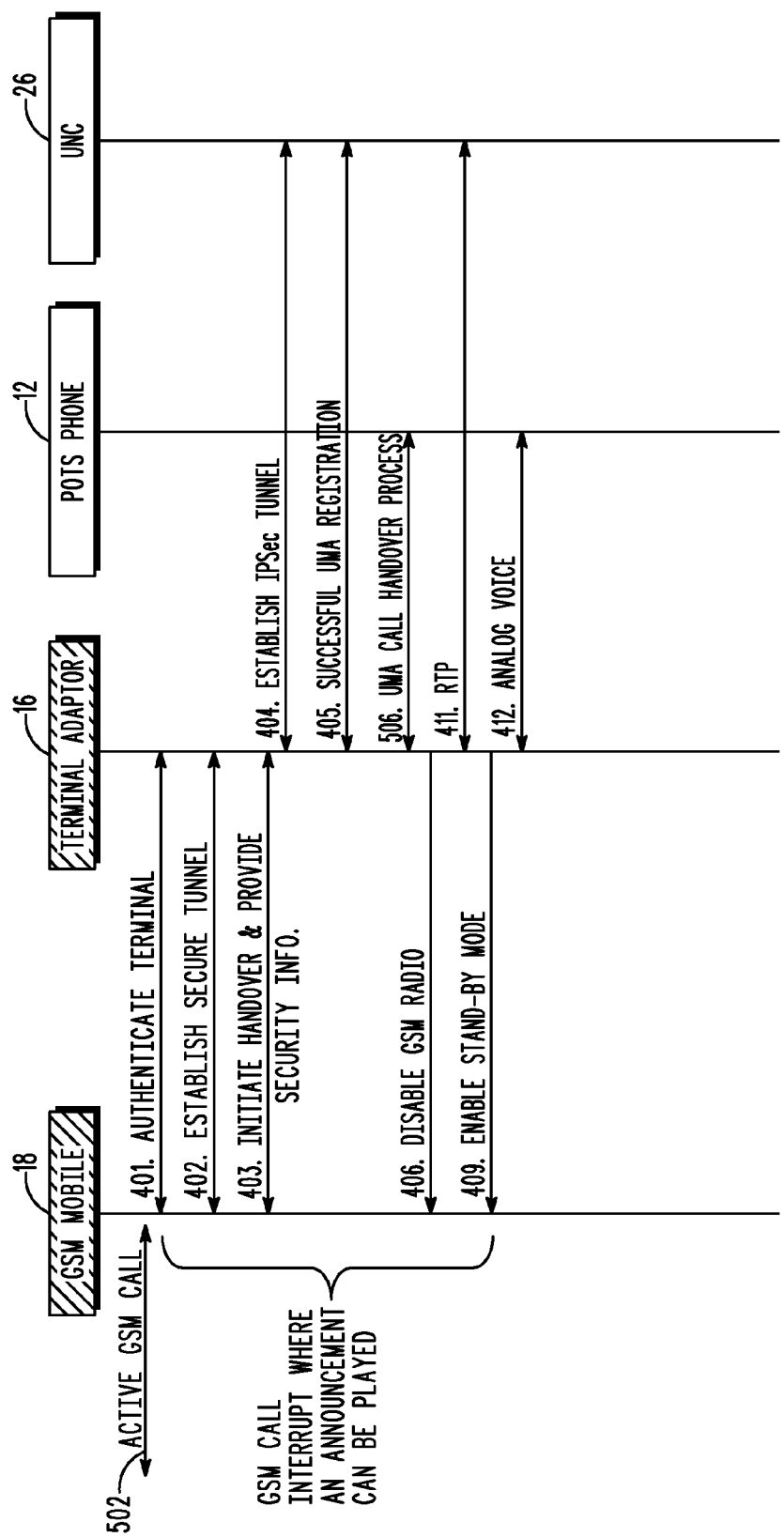
FIG. 5 is a signal flow diagram illustrating the information conveyed between the mobile device, mobile device terminal, POTS phone, and the UMA Network Controller when the user docks the mobile device while in a call, then switches to a POTS phone in accordance with some embodiments of the present invention.

Referring now to FIG. 5, a signal flow diagram is provided for when a mobile subscriber docks a mobile device 18 during an ongoing call, then switches to using a POTS phone 12 to continue the call is shown. A mobile subscriber who is engaged in a phone conversation 502 using mobile device 18, docks mobile device 18 in the mobile device terminal 16 by placing the mobile device 18 in the mobile device terminal 16 cradle and moves to continue the phone conversation from the POTS phone 12. The sequence to authenticate 401 the mobile device terminal 16 occurs when the docking interface port 31 of the mobile device 18 device is electrically connected to the docking terminal 32 on the mobile device terminal 16. The mobile device terminal 16 exchanges authentication information with the mobile device 18 to ensure that only a mobile device 18 that is authorized to use this mobile device terminal 16 is able to establish a secure communication path 402. It is understood that more than one mobile device 18 may be authorized to use the mobile device terminal 16.

Once the secure communication path 402 is established, the mobile device terminal 16 initiates a handover 403 and requests the mobile ID number and system protocol information from the mobile device 18. The mobile device terminal 16 receives the mobile ID number and system protocol information from the mobile device 18 and stores the mobile ID and system protocol information in the memory 44. The mobile device terminal 16 then establishes an IPSec pathway 404 between the mobile device terminal 16 and the UNC 26, seeks UMA registration 405 in the same manner stated above with respect to FIG. 4, and if approved by the UNC 26, the subscriber's current location information stored in the core network 2 is updated. From that point on, mobile voice and data traffic is routed to the mobile device terminal 16 via the UMA Network rather than through the Cellular Radio Access Network 4.

The UMA call handover process 506 starts as the call is then handed over from the Cellular Radio Access Network 4 to the UMA Network. The mobile device terminal 16 switches the GSM radio of the mobile device 18 to a non-transmit, non-receive mode 406 and places the mobile device 18 in stand-by mode 409. The GSM communication signal is carried from the mobile device terminal 16 to the UNC 26 using standard RTP Packets 411. The signal between the POTS phone 12 and mobile device terminal 16 remains analog 412. The microprocessor 42 translates the GSM communication in RTP packets received from the UNC 26 into analog to be sent to the POTS phone 12. The microprocessor 42 also translates the analog signals received from the POTS phone 12 into GSM communication RTP packets to be sent to the UNC 26. The mobile subscriber may then continue the phone conversation through the POTS phone 12. Other than the actions and duration of placing the mobile device 18 in the mobile device terminal 16 and picking up the POTS phone 12, this process is transparent to the mobile subscriber. It appears to the core network, electronically, as if the mobile device had just switched from one BSC to another BSC. In an alternate embodiment, a GSM Call Transfer announcement can be played during the interval when the mobile device 18 is docked and the POTS phone 12 is picked up. A GSM call transfer announcement can be an audible sound or a voice message heard by one or more parties to the communication. There may be a switching and connection time of about a half to ten seconds as the call is switched from the mobile device 18, communicating on a cellular access network, to the POTS phone 12 when the UNC 26 is handling the call.

Figure 6:
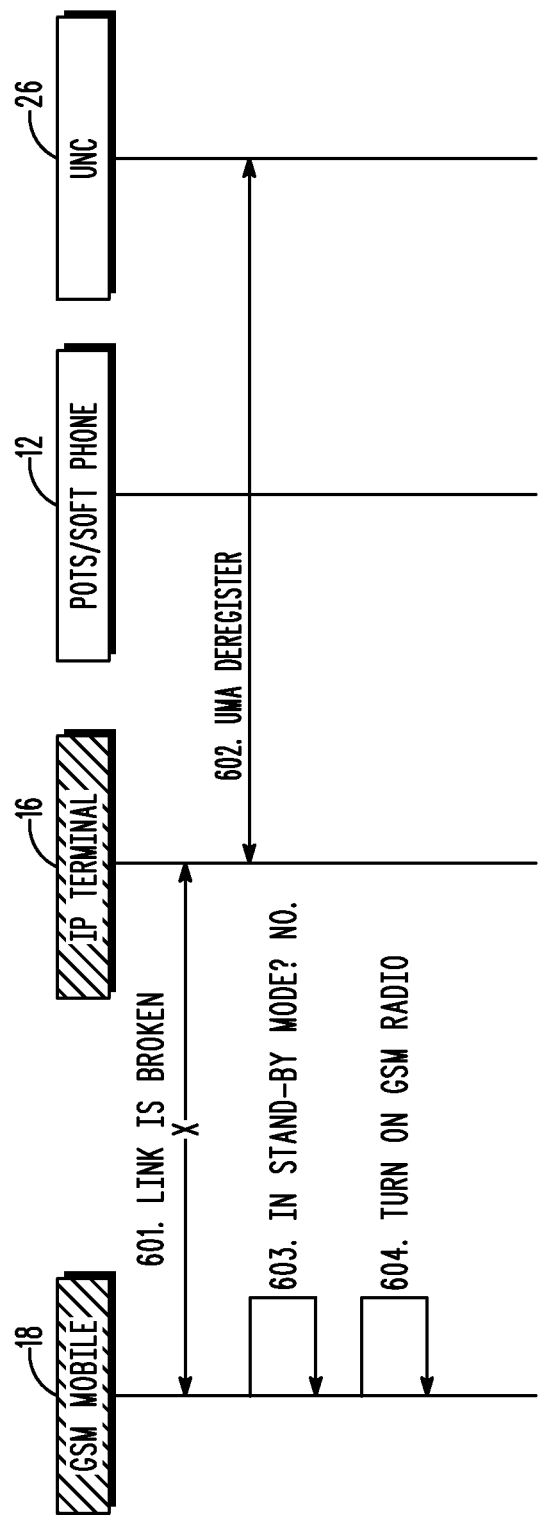
FIG. 6 is a signal flow diagram illustrating the information conveyed between the mobile device, mobile device terminal, POTS phone, and the UMA Network Controller when a user undocks the mobile device when not in a call in accordance with some embodiments of the present invention.

Referring now to FIG. 6, a signal flow diagram is provided for when a mobile subscriber undocks or retrieves a mobile device 18 from a mobile device terminal 16 when not engaged in a call. A mobile subscriber not engaged in a phone conversation or other communication undocks the mobile device 18 from the mobile device terminal 16 by lifting the mobile device 18 from the mobile device terminal 16 cradle. The electrical connection between the docking interface port 31 of the mobile device 18 and the docking terminal 32 of the mobile device terminal 16 is terminated 601. The mobile device terminal 16 de-registers from the UMA Network 602.

The mobile device terminal 16 communicates to the UNC 26 that the mobile device 18 is no longer active on IP. The UNC 26 removes the mobile device terminal 16 from UNC 26 registration list. The UNC 26 transfers all GSM communications from the UMA Network back to the Cellular Radio Access Network 4. The mobile device 18 confirms that it is not in stand-by mode 603 when the electrical connection between the docking interface port 31 and the docking terminal 32 of the mobile device terminal 16 was terminated. The GSM radio of the mobile device 18 is then turned back on 604. The mobile device 18 now can communicate directly with the Cellular Access Network 28. Again, it appears as if the mobile device 18 has been handed off to another BSC 6.

Figure 7:
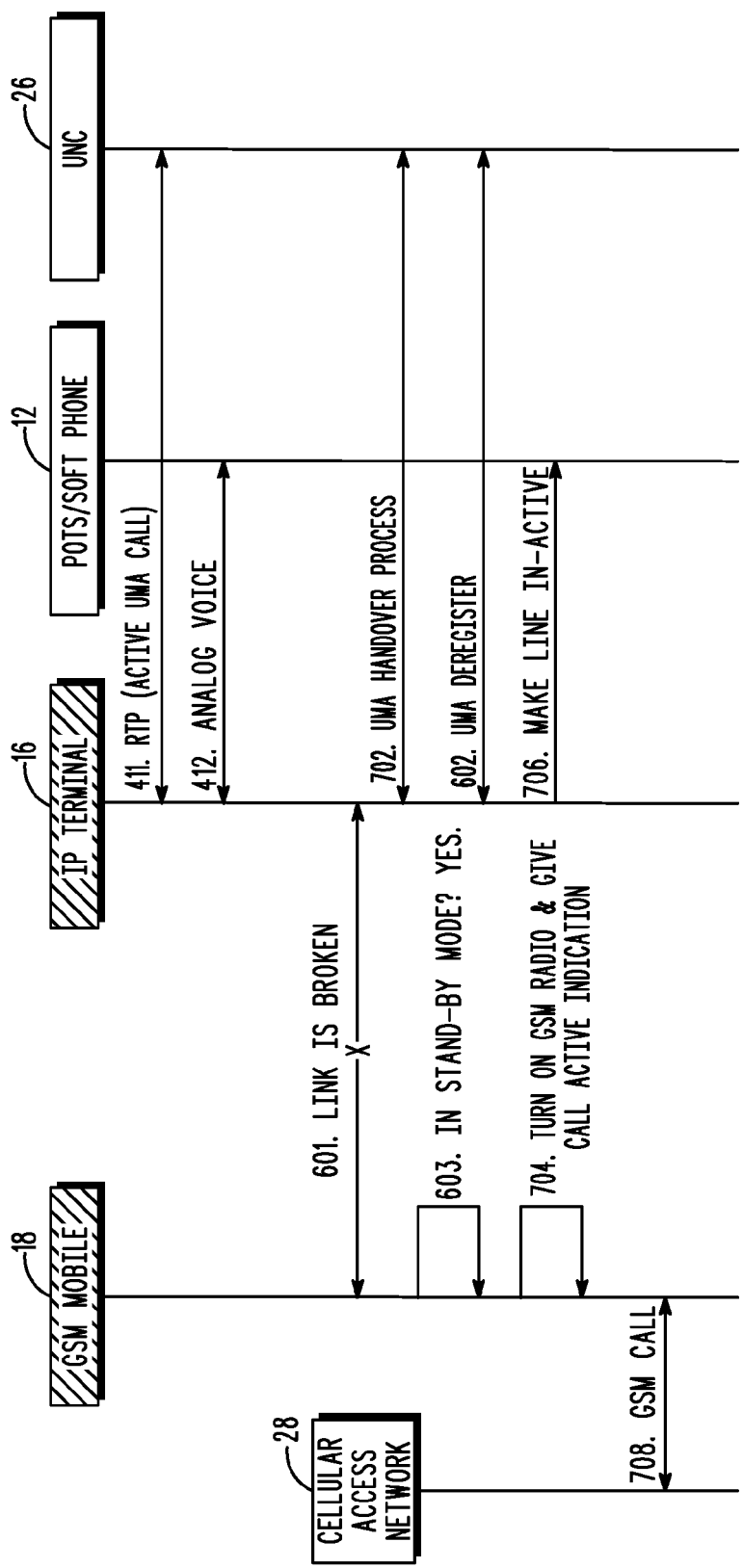
FIG. 7 is a signal flow diagram illustrating the information conveyed between the mobile device, mobile device terminal, POTS phone, and the UMA Network Controller when a user undocks the mobile device when in a call in accordance with some embodiments of the present invention.

Referring now to FIG. 7, a signal flow diagram is provided when a mobile subscriber undocks a mobile device 18 while engaged in a call. A mobile subscriber engaged in a phone conversation 211, 212 using the POTS phone 12 undocks the mobile device 18 from the mobile device terminal 16 by lifting the mobile device 18 from the mobile device terminal 16 cradle. The electrical connection between the docking interface port 31 of the mobile device 18 and docking terminal 32 of the mobile device terminal 16 is terminated 601 while RTP packets are being exchanged between the mobile device terminal 16 and the UNC 26. The UNC 26 performs a UMA handover 702 in which the GSM communications are handed over from the UNC 26 to the BSC 6 of the cellular radio access network 4. The mobile device 18 confirms that it is in stand-by mode 603 and waits while UMA deregistration 602 occurs between the mobile device terminal 16 and the UNC 26. The connection between the POTS phone 12 and the mobile device terminal 16 also is inactivated 706. The GSM radio for the mobile device 18 is switched on, and the user is given a Call Active indication 704 through a UI located on the mobile device 18. The resulting handoff from the UNC 26 to the Cellular Access network appears as if a cellular communication was being handed off from one BSC to another BSC. The mobile subscriber is free to continue his call 708 through the Cellular Radio Access Network 4 using the mobile device 18 while the mobile device terminal 16 then renders the communication line 4 to the POTS phone 12 inactive.

In additional embodiments of the present invention, the connection between the docking interface port 31 of mobile device 18 and the docking terminal 32 of the mobile device terminal 16 is a wireless medium, such as Bluetooth or WiFi, such that physical docking does not occur. In one embodiment, the mobile device 18, through the docking interface port 31, or the mobile device terminal, through the docking terminal 32, detects the wireless connection to the mobile device terminal and commences terminal authentication 401. In response to transfer of GSM communications to the UMA network, the GSM radio of the mobile device 18 is not switched to a non-transmit/non-receive mode. Instead the mobile device 18 can continue to be used, this time communicating through the UMA network. In another embodiment, the mobile subscriber is prompted through a UI on the mobile device 18 to transfer to the POTS phone 12 or to continue the GSM communications through the UMA network on the mobile device 18.

In another embodiment of the present invention, the connection between the docking interface 31 of the mobile device 18 and the docking terminal 32 of the mobile device terminal 16 is a wireless medium, such as Bluetooth or WiFi, such that physical docking does not occur. Upon detection of the wireless connection between the mobile device 18 and mobile device terminal 16, the mobile subscriber is prompted through a UI on the mobile device 18 to commence authentication 401 and UMA access. In another embodiment, the mobile subscriber initiates through a UI on the mobile device 18 the attempt by mobile device 18 to establish a wireless connection with the mobile device terminal 16.

In another embodiment of the present invention, the docking interface port 31 of the mobile device 18 is a USB connection port or a mini-USB connection port. The docking terminal 32 of the mobile device terminal 16 is also a USB connection or mini-USB connection adapted to be connected to the docking interface port 31. Docking of the mobile device 18 occurs when the docking interface port 31 is connected to the docking terminal 32 either directly or through a cable.

In another embodiment of the present invention, the mobile device terminal 16 is connected to a display, such as a television or monitor. In this embodiment, when the mobile device 18 is docked in the mobile device terminal 16 and a call comes in, an incoming call message, which may include caller identification, that is, caller ID, information, can be broadcast across the picture of the display or broadcast audibly to the user.

A method and apparatus has been disclosed for establishing Global System for Mobile (GSM) communications through an Unlicensed Mobile Access (UMA) Network by enabling Voice over IP (VoIP) access into the GSM network from various IP enabled mobile device terminals and a mechanism to authenticate & use such terminals without any change to the UMA or GSM network. Embodiments of the present invention facilitate the transfer of wireless GSM communications to a GSM connection through wire.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A mobile device terminal comprising:
a microprocessor circuit;
a memory in data communication with the microprocessor circuit;
a docking interface in electronic communication with the microprocessor circuit and that is adapted to communicate with a mobile device and receive a secure protocol information and identification number from the mobile device, wherein the secure protocol information and identification information is stored in the memory and wherein the secure protocol information includes authentication information, subscription information and network state information;
a first communication port adapted to be connected to a first communication medium, wherein the communication medium is connected to a plain old telephone system (POTS);
a second communication port adapted to be connected to a second communication medium, wherein the second communication medium is connected to an internet connection device; and wherein the mobile device terminal emulates the mobile device functionality by using the stored secure protocol information and identification number to send and receive GSM communication via the second communication port.

2. The mobile device terminal of claim 1, wherein the second communication port of the mobile device terminal establishes an internet communication with an Unlicensed Mobile Access Network Controller to enable Voice over Internet Protocol communications utilizing the stored secure protocol information and identification number.

3. The mobile device terminal of claim 1, wherein the microprocessor converts analog signals received from the POTS into a GSM signal formatted in Real Time Protocol packets to be sent to an Unlicensed Mobile Access Network Controller and converts a GSM signal that is formatted in Real Time Protocol Packets received from the Unlicensed Mobile Access Network Controller into analog signals to be sent to the POTS.

4. The mobile device terminal of claim 1, wherein the mobile device terminal provides a stand-signal to the mobile device upon receipt of an analog signal by the mobile device terminal from the POTS.

5. The mobile device terminal of claim 1, wherein the mobile device terminal provides a no-transmit/no-receive signal to a GSM radio of the mobile device.

6. The mobile device terminal of claim 1, wherein the docking interface is one of a Universal Serial Bus (USB), a mini-USB connection, a WiFi connection, and a Bluetooth connection.

7. The mobile device terminal of claim 1, wherein the first communication medium is one of an RJ-11 connection, a WiFi, and a Bluetooth connection.

8. The mobile device terminal of claim 1, wherein the second communication medium is one of a modular connector, a conductor, a WiFi connection, a Bluetooth connection, and a wireless communications connection.

9. A computer comprising the mobile device terminal of claim 1.

10. A method of establishing Global System for Mobile (GSM) communications through an Unlicensed Mobile Access Network, the method comprising:
    establishing data communication between a mobile device terminal and a mobile device;
    receiving, by the mobile device terminal, a secure protocol information and an identification number from the mobile device, wherein the secure protocol information includes authentication information, subscription information and network state information;
    storing, by the mobile device terminal, the secure protocol information and the identification number to a memory of the mobile device terminal;
    establishing an Internet Protocol (IP) secure communication path between the mobile device terminal and an Unlicensed Mobile Access Network Controller,
    using the stored secure protocol information and identification number to register the mobile device terminal with the Unlicensed Mobile Access Network Controller;
    receiving, by the mobile device terminal, an analog signal from a POTS via a second communication medium; and
    converting, by the mobile device terminal, the analog signal received from the POTS into a GSM communication formatted in Real Time Protocol Packets;
    sending the converted analog signal, received from the POTS phone, from the mobile device terminal via the established IP secure communication path to the Unlicensed Mobile Access Network Controller, by using the stored secure protocol information and the identification number.

11. The method of claim 10, further comprising establishing a secure communication path between the mobile device terminal and the mobile device.

12. The method of claim 10, further comprising receiving GSM communications formatted in Real Time Protocol Packets from the Unlicensed Mobile Access Network Controller.

13. The method of claim 12, further comprising:
    converting the GSM communications formatted in Real Time Protocol Packets into analog signals; and
    sending the analog signals to the POTS.

14. The method of claim 10, further comprising providing a signal to deregister the mobile device terminal from the Unlicensed Mobile Access Network Controller upon termination of the data communications between the mobile device terminal and the mobile device.

15. The method of claim 10, further comprising providing a signal to place the mobile device in a stand-by mode upon the mobile device terminal receiving the analog signal from the POTS.

16. The method of claim 15, further comprising providing a signal to remove the mobile device from the stand-by mode upon a termination of the analog signal from the POTS.

17. The method of claim 10, further comprising encrypting the secure communications path between the mobile device and the mobile device terminal.

18. The method of claim 10, further comprising sending a call information from the mobile device terminal to a display.

19. A method of emulating a GSM mobile device connected to a Cellular Radio Access Network when a mobile device is placed in communication with a mobile device terminal, the method comprising:
    establishing an encrypted communication link between the mobile device and mobile device terminal;
    receiving by the mobile device terminal, information from a Subscriber Information Module (SIM) of the GSM mobile device, wherein the information includes a secure protocol information and wherein the secure protocol information includes authentication information, subscription information and network state information;
    storing the information from the SIM in a memory of the mobile device terminal;
    transmitting the information from the mobile device terminal to a Core Mobile Network; and
    registering the mobile device terminal with the Core Mobile Network thereby emulating the mobile device functionality by the mobile device terminal.

* * * * *